US011099970B2

(12) United States Patent
Penfold

(10) Patent No.: US 11,099,970 B2
(45) Date of Patent: *Aug. 24, 2021

(54) CAPTURING TASK TRACES FOR MULTIPLE TASKS

(71) Applicant: INTERNATIONAL BUSINESS MACHINES CORPORATION, Armonk, NY (US)

(72) Inventor: Colin R. Penfold, Ropley (GB)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/751,692

(22) Filed: Jan. 24, 2020

(65) Prior Publication Data

US 2020/0159645 A1    May 21, 2020

Related U.S. Application Data

(63) Continuation of application No. 16/127,299, filed on Sep. 11, 2018, now Pat. No. 10,579,505.

(51) Int. Cl.
| | |
|---|---|
| *G06F 11/36* | (2006.01) |
| *G06F 11/34* | (2006.01) |
| *G06F 9/52* | (2006.01) |
| *G06F 9/54* | (2006.01) |
| *G06F 11/07* | (2006.01) |

(52) U.S. Cl.
CPC ............ *G06F 11/3636* (2013.01); *G06F 9/52* (2013.01); *G06F 9/546* (2013.01); *G06F 11/0778* (2013.01); *G06F 11/3466* (2013.01); *G06F 2201/835* (2013.01)

(58) Field of Classification Search
None
See application file for complete search history.

(56) References Cited

U.S. PATENT DOCUMENTS

| | | |
|---|---|---|
| 4,598,364 A | 7/1986 | Gum |
| 8,271,956 B2 | 9/2012 | Howland |
| 9,582,312 B1 | 2/2017 | Karppanen |
| 2011/0219376 A1 | 9/2011 | Williams |
| 2012/0042212 A1 | 2/2012 | Laurenti |
| 2013/0191693 A1 | 7/2013 | Ross |

OTHER PUBLICATIONS

Mell et al., "The NIST Definition of Cloud Computing, Recommendations of the National Institute of Standards and Technology", Special Publication 800-145, Sep. 2011, 7 pages.
Pending U.S. Appl. No. 16/127,299, filed Sep. 11, 2018, entitled: "Capturing Task Traces for Multiple Tasks", 38 pages.
IBM: List of IBM Patents or Patent Applications Treated As Related (Appendix P), Jan. 24, 2020, pp. 1-2.

*Primary Examiner* — Qing Chen
(74) *Attorney, Agent, or Firm* — Teddi E. Maranzano

(57) ABSTRACT

Method and system are provided for capturing task traces for multiple tasks. The method includes capturing in a task trace structure recent trace data entries for a task of multiple tasks segmented into a predefined number of available blocks, wherein a task trace structure is provided for each of multiple tasks in parallel, wherein trace data entries are written to a block with a timestamp of the trace data entries. The method also includes storing in a global trace structure pushed blocks from the multiple task trace structures of older data that exceed the predefined number of blocks of the task trace structures, wherein the blocks are ordered in the global trace structure by the pushed order of the blocks from the multiple task trace structures.

20 Claims, 11 Drawing Sheets

CAPTURING TASK TRACES FOR MULTIPLE TASKS

BACKGROUND

The present invention relates to capturing task traces of multiple tasks, and more specifically, to capturing task traces for recent history and stalled tasks.

In computing, a core dump, memory dump, or system dump consists of the recorded state of the working memory of a computer program at a specific time; generally, when the program has crashed or otherwise terminated abnormally. However, many software problems are due to stalls or errors that occur a significant time before the dump is obtained.

Capturing traces for tasks by using a trace queue and storing contiguous sequences of commands may be used to simplify debugging or error diagnosis. Wrap-around memory only trace tables are often required for performance reasons. However, these are usually only good for debugging recent events.

Some products have the option of capturing a trace associated with each task. These are useful for debugging problems, which are related to a single task, but cannot generally be used for debugging problems related to task interactions. Task traces are usually very fast as they do not require any locking.

Some products have the option of capturing a global trace of all events in the system. This will allow debugging of task interactions. However, due to the finite size of a trace table, it generally cannot be used for stalled tasks. Since a contiguous global trace is shared between tasks it requires locking to write records and therefore it is slower than a task trace.

Some products have the option of capturing both task traces and global traces. In such cases it is necessary to write two trace records, which performs badly.

SUMMARY

According to an aspect of the present invention there is provided a computer-implemented method for capturing task traces for multiple tasks, comprising: capturing, in a task trace structure, recent trace data entries for a task of multiple tasks segmented into a predefined number of available blocks, whereby a task trace structure is provided for recording trace data entries for each task of the multiple tasks that execute in parallel, and whereby the recent trace data entries for the task of the multiple tasks are written to a block in the task trace structure with a timestamp of the recent trace data entries for the task. A global trace structure stores pushed blocks from the task trace structures of the multiple tasks of older data that exceed the predefined number of available blocks of the task trace structures of the multiple tasks. The pushed blocks are ordered in the global trace structure by an order of the pushed blocks from the task trace structures of the multiple tasks.

According to another aspect of the present invention there is provided a system for capturing task traces for multiple tasks, comprising: a processor and a memory configured to provide computer program instructions to the processor to execute the function of the components: a trace data writing component configured to write recent trace data entries for a task of multiple tasks that execute in parallel with each task of the multiple tasks having a task trace structure segmented into a predefined number of available blocks, wherein a task trace structure is provided for recording trace data entries for each task of the multiple tasks that execute in parallel, and wherein the recent trace data entries for the task of the multiple tasks are written to a block in the task trace structure with a timestamp of the recent trace data entries for the task of the multiple tasks; and a trace structure managing component configured to manage the task trace structures of the multiple tasks and a global trace structure, whereby the global trace structure is provided for recording older trace data entries from all of the multiple tasks, wherein the task trace structures of the multiple tasks capture the recent trace data entries for a task of the multiple tasks and the global trace structure maintains an ordered structure of older blocks pushed from all of the task trace structures of the multiple tasks, and whereby an oldest block from the global trace structure is recycled for overwriting by the task trace structures of the multiple tasks.

According to a further aspect of the present invention there is provided a computer program product for capturing task traces for stalled tasks, the computer program product comprising a computer readable storage medium having program instructions embodied therewith, the program instructions executable by a processor to cause the processor to: capture, in a task trace structure, recent trace data entries for a task of multiple tasks segmented into a predefined number of available blocks, whereby a task trace structure is provided for recording trace data entries for each task of the multiple tasks that execute in parallel, and whereby the recent trace data entries for the task of the multiple tasks are written to a block in the task trace structure with a timestamp of the recent trace data entries for the task; and store, in a global trace structure, pushed blocks from the task trace structures of the multiple tasks of older data that exceed the predefined number of available blocks of the task trace structures of the multiple tasks, whereby the global trace structure is provided for recording older trace data entries from all of the multiple tasks, and whereby the pushed blocks are ordered in the global trace structure by an order of the pushed blocks from the task trace structures of the multiple tasks.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
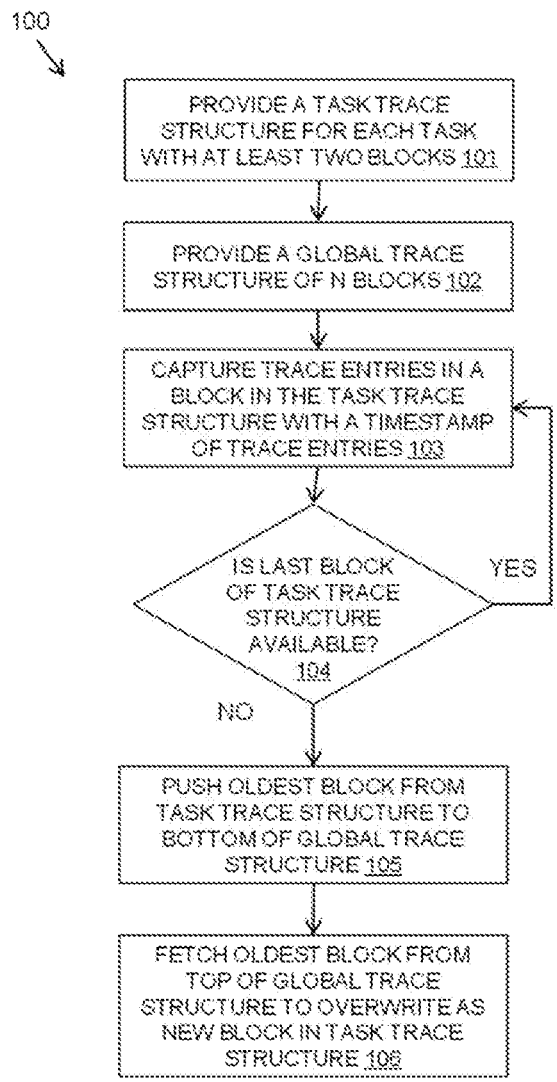
FIG. 1 is a flow diagram of an example embodiment of an aspect of a method in accordance with the present invention of capturing task traces.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for efficiently capturing traces of tasks by using a trace structure that captures contiguous trace data by tracing every task to allow diagnosis of stalled tasks and tracing of the whole system to cover trace data for most recent events.

The method and system use two simultaneous trace modes to capture trace data entries. A first trace mode captures multiple task traces for tasks with each task capturing its task trace in a task trace structure. Each task trace structure captures task traces for a particular task in parallel with other tasks. The recent contiguous trace data entries are segmented into a predefined number of available blocks in each task trace structure. Trace data entries are written to a block with a timestamp.

A second trace mode is provided for storing in a global trace structure pushed blocks of older data that exceed the predefined number of blocks from the multiple task trace structures of the first trace mode. The blocks are ordered in the global trace structure by the when the blocks were put to the global data structure from the task data structures.

The global trace structure accommodates a predefined number of blocks and when a block is pushed from a task trace structure of a task to the global trace structure, an oldest block of the global trace structure is fetched by the task trace structure to be overwritten by new trace data entries in the task trace structure. In this way, one block of data is added to the global trace structure from a task trace structure, as the oldest block is removed to be available to be written over by the task trace structure. This recycles the blocks from the global trace structure to the multiple task trace structures.

The fetching of the oldest block from the global trace structure may be a pre-fetching and therefore, the global trace structure may only become nearly full to allow the pre-fetching. The global trace structure may be a first in first out queue in which the pushed blocks are added to a bottom of the queue and a block is fetched from the top of the queue.

A task trace is the sequence of trace records for a task. These are written into blocks in the task trace structure. All records are time ordered and contiguous for this task by definition since they are written in a sequence for the task. The task trace structures may be a trace table for each task, with each trace table being segmented into blocks such that at least two blocks of trace data is readily available for each task. The space allocation of trace data may be specified in blocks with a block length provided to accommodate a size of a trace data set.

A global trace is the time ordered merging of all the records from all the task traces. There may be gaps in the global trace where records have been deleted by blocks for a task added to and then removed from the global trace structure.

A contiguous global trace is part of the global trace where it may be guaranteed that no records have been deleted up until the end of the trace. The end of the trace may usually be when the dump is taken.

The blocks may be scanned to create a contiguous global trace. The contiguous global trace may be obtained by combining task trace structure blocks and global trace structure blocks. The traces may be formatted by taking a machine readable trace and producing a human readable output.

This method combines the capability of tracing every task to allow diagnosis of stalls, whilst also tracing of the whole system to cover recent events. This is achieved with a single trace entry, thereby avoiding writing two records, one for each purpose.

Additionally, as most of the tracing is done with task traces, unlike a single trace for multiple tasks, there is minimal locking required. This leads to improved performance compared to a single trace method.

Tasks may share processors, or may have exclusive use of a processor. A system where tasks share a process will have a mechanism whereby one task can relinquish control of the process in favor of another task.

Referring to FIG. 1, a flow diagram 100 shows an example embodiment of the described method of capturing task traces for multiple tasks.

A task trace structure is provided 101 for each task of multiple tasks that may execute in parallel. Each task trace structure may have at least two blocks into which the task trace entries may be written.

In one embodiment, the task trace structure is a task trace table segmented into blocks. The total task table size may allow for at least two blocks per task. The number of entries on a block is configured to be enough to analyze a stalled task. For example, this may be the last two application programming interface (API) requests. Trace entries of a trace data set must fit in a block.

A global trace structure is provided 102 of n blocks for recording older trace entries from all of the tasks. The global trace structure may be a first in first out queue providing a global free chain.

Trace entries are captured 103 by writing to a block in a task trace structure. Trace entries may be captured for different tasks simultaneously in the parallel task trace structure. Trace entries are captured 103 without locking as this structure is owned by the task. Trace entries are written with a timestamp, which is of significant precision to be unique.

A timestamp will be unique for a task. If there are multiple processors, the timestamp may be the same for both events. This would indicate that both events did happen at exactly the same time, which could only happen if there was no locking required between these two events. The trace would show the timestamps and would indicate if these were identical. This may be useful in debugging a problem where the programmer made an error in assuming that the events did not require locking.

Trace entry capture is repeated for a next block in the task trace structure and it is determined 104 if a block in a task trace structure is a last available block. If it is not, the method continues to repeat for a next block. If it is the last available block, an oldest block of a task trace structure may be pushed 105 to the global trace structure and an oldest block of the global trace structure may be recycled and fetched 106 from the global trace structure to the task trace structure for overwriting with new task trace entries.

In this way, each task has a number of blocks to write trace entries to. When a task has used up its last block, the oldest block of the task trace structure is placed at the end of the global trace structure, and a new block is obtained from the top of global trace structure. When a block with trace entries is pushed onto the global trace structure, it is valid trace data until it is removed from the global trace structure by another task when it reaches the top of the global trace structure.

Locking is only required when pushing and fetching blocks from the global trace structure as each of the multiple tasks may be attempting to push or fetch blocks simultaneously. The pushing and fetching may be by put and get operations to the global trace structure in the form of a queue.

A block may be pre-fetched from the global trace structure by a task to increase efficiency.

In a dump, there are two ways of looking at the dump: by task and by contiguous global trace.

Each task will have available the number of blocks at the task trace structure, plus any blocks still on the global trace structure. Therefore, if there are two blocks in a task trace structure, at least two blocks of trace data will be available for all tasks, unless a task is new and has written less than the two blocks.

When formatting the trace to provide a human readable output, the task blocks and the free chain blocks may be combined to produce a contiguous task traces and a contiguous global trace. The term contiguous indicates that there are no events missing until the time that the dump takes place. A contiguous trace may provide the trace data in a solid uninterrupted block, instead of in multiple blocks.

Contiguous trace data may be obtained for each task as well as for a contiguous global trace of all tasks. All task traces are contiguous. However, the global trace, which is the sum of all the task traces, is partially contiguous and it is necessary to identify where the global trace is contiguous from, and to maximise this amount of data.

Contiguous trace data can be obtained by obtaining contiguous trace data for each task by combining the blocks from the task trace structures and the global trace structure for a task. The ordered blocks may be scanned to obtain contiguous trace data for a task.

The contiguous trace data of the multiple tasks may then be merged using the timestamps of the data entries of trace data to obtain global contiguous data. This may be done by having multiple time ordered queues (each trace entry to the task trace will always be time ordered and will have a timestamp). The top entry of each queue is read and the oldest removed from the queue and put on the global contiguous output.

Figure 2:
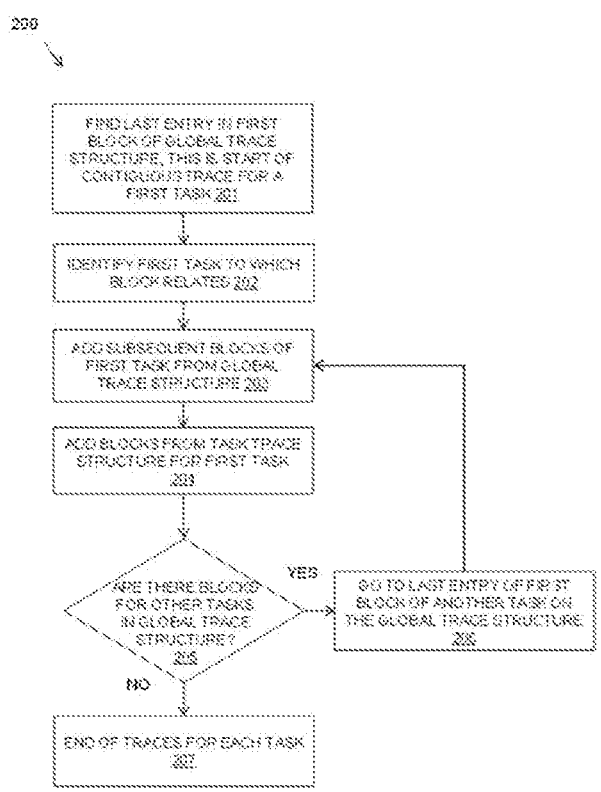
FIG. 2 is a flow diagram of an example embodiment of a method in accordance with the present invention of another aspect of obtaining a task trace.

FIG. 2 shows a flow diagram 200 of an example embodiment of the described method of obtaining contiguous trace data for each task by combining the task trace structures and the global trace structure.

A last entry in an oldest block of the global trace structure is found 201 for a task; this is the start of the available contiguous trace. It is the last entry since that was the time when the block was put on the global trace structure. The first entry in a block may have been a long while before this.

The method may identify 202 to which task the block relates and may add 203 subsequent blocks relating to this task from the global trace structure. When there are no more blocks for the task remaining in the global trace structure, the method may add 204 the blocks from the task trace structure as these are the most recent trace data of the task.

It may be determined 205 if there are blocks for other tasks in the global trace structure. If so, the method may go 206 to the last entry of the oldest block of another task in the global trace structure.

If there are no blocks of other tasks in the global trace structure, the method may end 207 and result in formatting a task trace by outputting in block order all records for that task. These may be scanned to produce contiguous data traces for each task.

Figure 3:
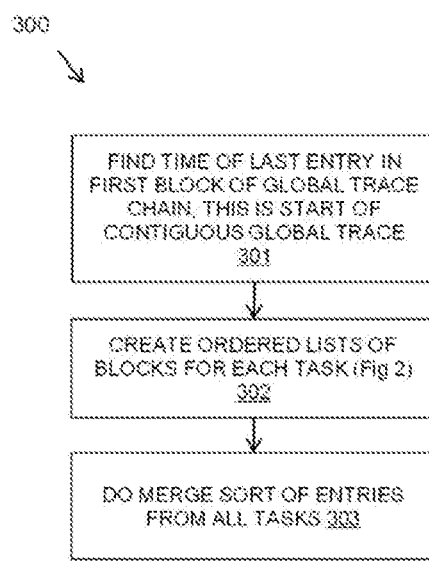
FIG. 3 is a flow diagram of an example embodiment of a method in accordance with the present invention of a further aspect of obtaining a contiguous global trace.

Referring to FIG. 3, a flow diagram 300 shows an example embodiment of the described method of obtaining a multi-task contiguous global trace.

The method may find 301 the time of the last entry in the first block of the global trace structure as the start of the contiguous global trace. The first block for each task written to the global chain will have been written after this time, and will therefore have at least one trace entry that is in the contiguous global trace. Subsequent blocks for that task written to the global chain will have all of their records written after this time in the contiguous global trace.

An array of time ordered queues or chains of blocks can be created 302, one for each task, where each block is after the start time. The trace entries of each block each have a time and are time ordered. Therefore, by looking at the oldest entry in each of the tasks it is possible to merge the trace entries into a contiguous global trace as described in the method of FIG. 2.

The method may do a merge sort 303 of entries from all the tasks. This may be by taking the multiple time ordered queues for each task with each trace entry time ordered and having a timestamp. The top trace entry of each queue is read and the oldest removed from the queue and put on the global contiguous output.

FIGS. 4A to 4D illustrate exemplary embodiments of the described method.

Figure 4A:
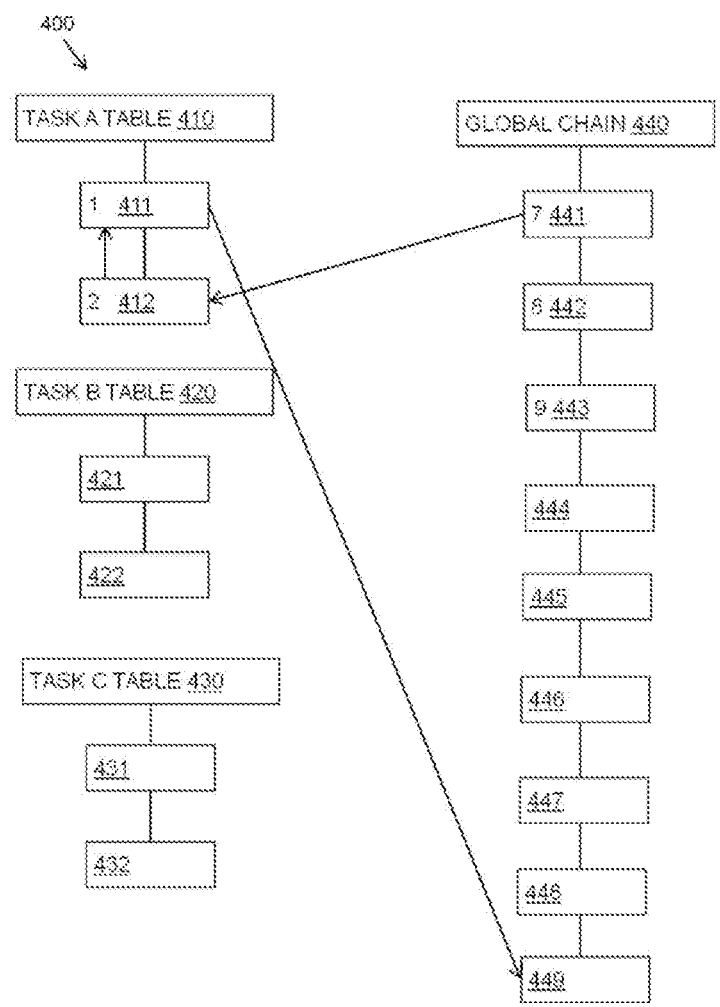
FIGS. 4A to 4D are schematic diagrams illustrating an example embodiment of a method in accordance with the present invention.

FIG. 4A illustrates an initial state 400 of three task trace structures as task A table 410, task B table 420, and task C table 430 and a global trace structure in the form of a global chain 440.

Each of the task tables 410, 420, 430 has two trace blocks 411, 412, 421, 422, 431, 432. The remaining blocks 441-449 are queued in the global chain 440.

Trace entries for a task are written to their blocks with no lock required to write a trace entry. Trace entries must fit in a block and trace entries have a timestamp.

Figure 4B:
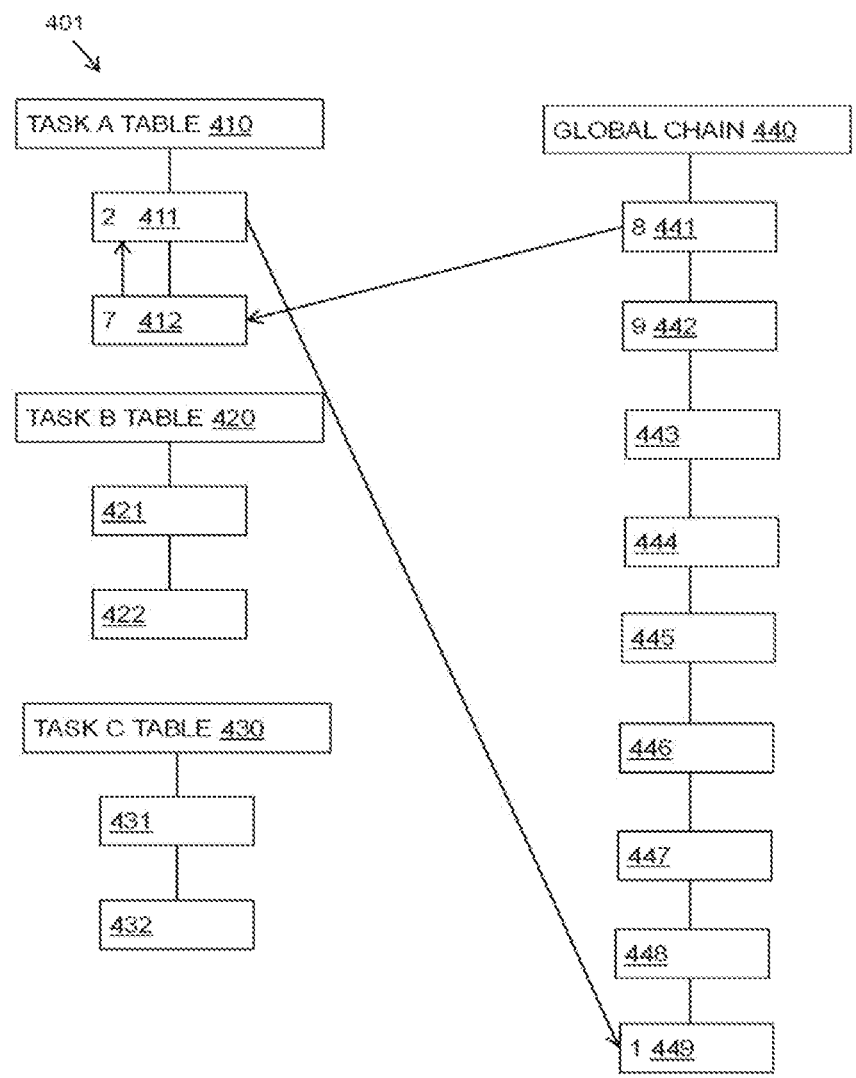

Task A writes trace entries to block 1 411 of the task A table 410 with trace entries fitting in a block, and then writing to block 2 412 of the task A table 410. When block 2 412 is full, block 1 411 is moved from the task A table 410 to the bottom of the global chain 440. Block 2 412 moves to the previous block 1 411 in the task A table 410. The block 7 441 at the top of the global chain 440 is moved to the bottom of the task A table 410, ready to be overwritten with new task A trace entries. FIG. 4B shows this recycling of blocks of task A in a next state 401.

Figure 4C:
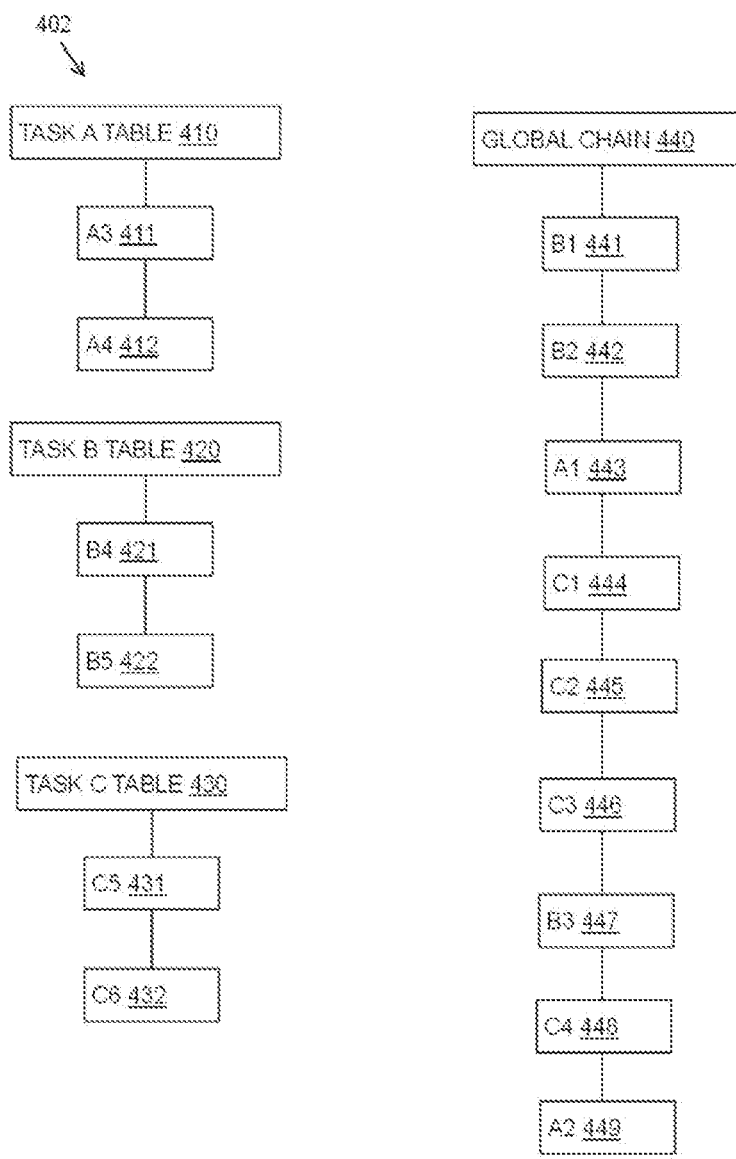

FIG. 4C shows a steady stage 402 of the tasks. At a steady stage, each task in this example has:
1 block filled in the task table;
1 block in process of filling in the task table; and
0–n blocks on global chain.

Each task has at least two blocks of possible trace. It has its own blocks in the task table 410, 420, 430 and any blocks on the global chain, which must be older entries for this task. In this example, the blocks on the global chain are (from oldest at the top) B1 441, B2 442, A1 443, C1 444, C2 445, C3 446, B3 447, C4 448, A2 449. Blocks on each task table are: task A table 410, A3 411, A4 412; task B table 420, B4 421, B5 422; task C table 430, C5 431, C6 432.

Figure 4D:
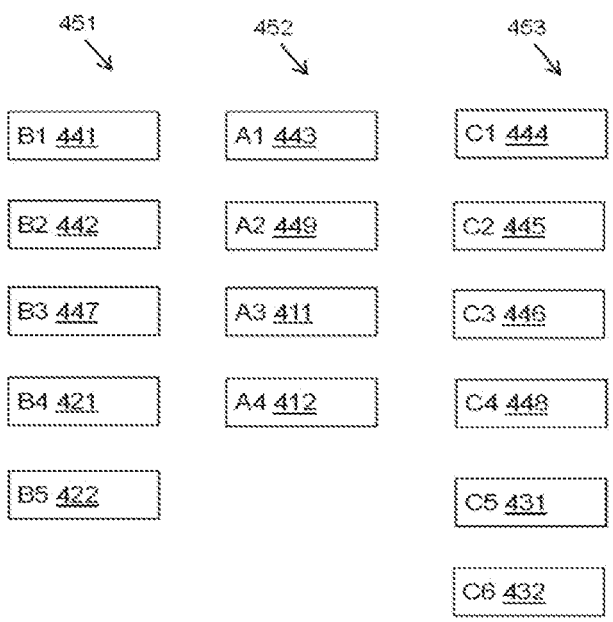

Formatting a task trace may involve for each task outputting in block order all the records for that task in the global chain (if any), then formatting those on the task table in block order. This will result in ordered blocks for each task 451, 452, 453 as shown in FIG. 4D. The oldest block in the global chain 440 is for task B and therefore this task trace is formatted with B1 441, B2 442, B3 447 all from the global chain 440 and B4 421 and B5 422 from the task B table 420. The next oldest block in the global chain 440 for a different task is for task A and therefore this task trace is formatted with A1 443, A2 449 from the global chain 440 and A3 411 and A4 412 of the task A table 410. The next oldest block in the global chain 440 for a different task is for task C and therefore this task trace is formatted with C1 444, C2 445, C3 446, C4 448 from the global chain 440 and C5 431 and C6 432 from the task C table 430.

A contiguous global trace may be generated. The global chain has a chain of n blocks, which are ordered according to the last entry in the block. The last entry of the top block on the global chain is the start of the contiguous global trace. Subsequent entries for this task on the global chain and also on the task chain must be more recent. The last entry of the top block of other tasks on the global chain must also be more recent. Subsequent entries for these tasks on the global chain, and all the blocks on their task chain must be more recent.

Contiguous global trace formatting may then be carried out. The start of the contiguous global trace is the time of last entry. Timestamps may be taken from system time of day (TOD) clock. The time of last entry may be timestamp $TOD_1$. An ordered list of blocks may be created for each task as described above in relation to FIG. 4D. A merge sort of entries may be carried out from the tasks, where the first entry in each task has $TOD>=TOD_1$.

The size of the contiguous global trace may be considered. In the following:
  Assume there are N blocks per task, and T tasks.
  Assume the task table for each task has 2 blocks, with the remaining blocks on the global chain.
  Assume N=3 blocks (this should be the minimum).
  Assume a block contains 25 trace records.
  The extremes may then be considered.
  Case 1: All tasks equally active:
  Each task has 2 blocks. One is full, the other has 1 record. Global chain contains 1 block for each task. However, only the last trace record in each block is guaranteed to have a TOD>=last record in $1^{st}$ block in global chain.
  Contiguous global trace size is: (25+1+1/75) i.e. 36%.
  Case 2: One task runaway after steady state:
  Each task has 2 blocks. One is full, the other has 1 record. Global chain only contains one task. All contiguous after last record in $1^{st}$ block in global chain. Contiguous global trace size (for T tasks) is: (T*(25+1)+(T−1)*25+1)/75T) i.e. 68%.

Therefore, Case 1 produces the fewest contiguous global trace records compared with the total amount of storage used for the trace blocks. For N blocks the amount will be (25*(N−2)+2)/25*N. This is approximately (N−2)/N, so 36% for N=3, 50% for N=4, 67% for N=6.

The method records stalled tasks in conjunction with a defined contiguous global trace. The method has a first trace mode in the form of the task trace and a second trace mode that uses a global chain to provide the contiguous global trace. Therefore, both trace modes are available at the same time without the cost of writing two trace records and to avoid some of the locking required.

The method in effect temporarily expands the most recent active tasks because these are the most recent trace events.

Figure 5:
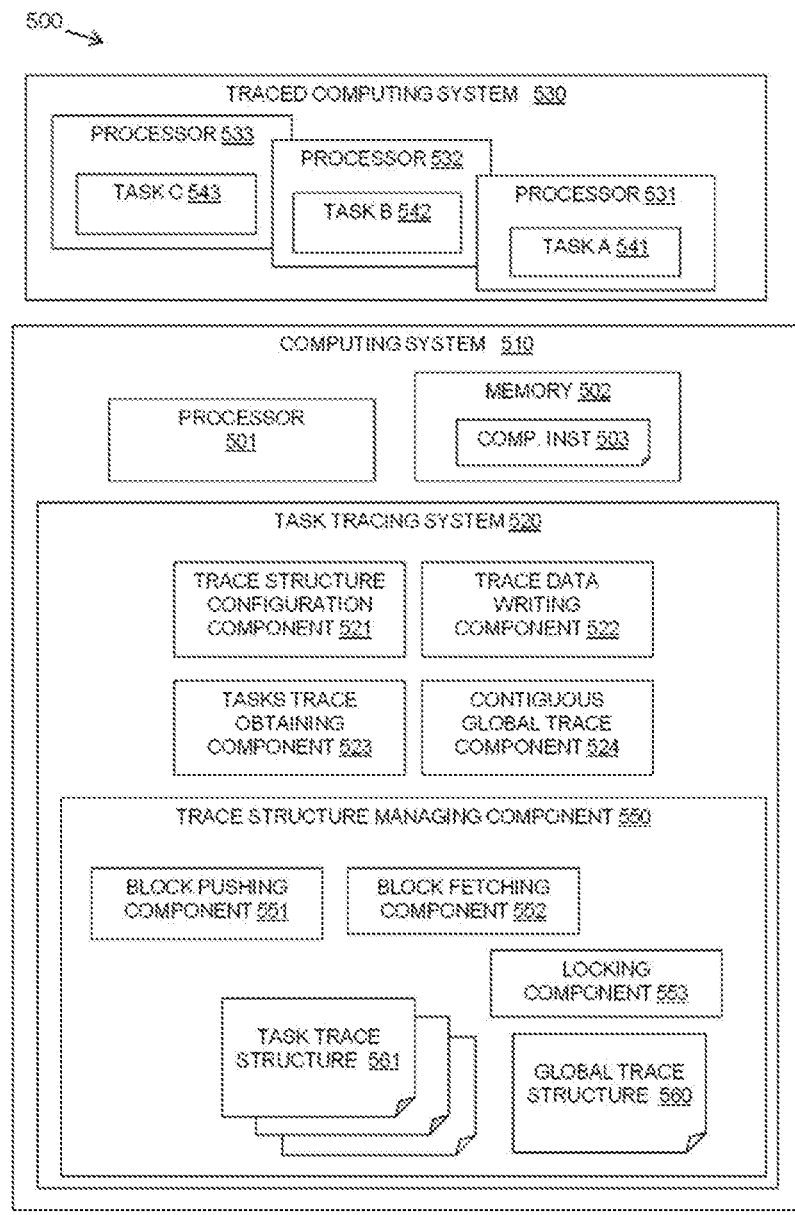
FIG. 5 is a block diagram of an example embodiment of a system in accordance with the present invention.

Referring to FIG. 5, a block diagram 500 illustrates an example embodiment of the described task trace system 520 for tracing task data entries of multiple tasks 541-543 of a traced computing system 530. The traced computing system 530 may include multiple processors 531, 532, 533 running parallel processing threads may be provided enabling parallel processing of tasks. Tasks 541-543 may share processors 531-533, or may have exclusive use of a processor 531-533. A system where tasks share a process will have a mechanism whereby one task can relinquish control of the process in favor of another task.

The task trace system 520 may be provided on the traced computing system 530 or on a separate remote computing system 510. The computing systems 510, 530 include at least one processor 501, 531, 532, 533, a hardware module, or a circuit for executing the functions of the described components which may be software units executing on the at least one processor. Memory 502 may be configured to provide computer instructions 503 to the at least one processor 501 to carry out the functionality of the task trace system 520.

The task tracing system 520 includes a trace data writing component 522 for writing trace data entries of multiple tasks in parallel with each task having a task trace structure 561 segmented into available blocks. The trace data entries are written to a block in a task trace structure 561 with a timestamp of the trace data entries. The trace data writing component 522 writes trace data entries to a block in a task trace structure 561 without locking as the task trace structure 561 is owned by the task.

The task tracing system 520 may include a trace structure configuration component 521 for configuring the task trace structures 561 and a global trace structure 560 with blocks that accommodate a sufficient number of trace data entries to analyze a stalled task and so that trace data entries fit in a block. A timestamp is configured to be sufficiently precise to be unique for a task. Each task trace structure 561 captures recent trace data entries and may include a predefined number of blocks that is greater than two. The global trace structure 560 maintains an ordered structure of older blocks pushed from all of the task trace structures 561 and may include a predefined number of blocks in a first in first out queue. An oldest block from the global trace structure 560 may be recycled to the task trace structures 561.

The task tracing system 520 may include a trace structure managing component 550 for managing the multiple task trace structures 561 and a global trace structure 560. The trace structure managing component 550 may include a block pushing component 551 for pushing a block from a task trace structure 561 of a task to the global trace structure when there is not enough available space in a block of the task trace structure 561 to capture new trace data entries and a block fetching component 552 for fetching an oldest block of the global trace structure 560 to be overwritten by the new trace data entries in the task trace structure 561. The block fetching component 552 may pre-fetch the oldest block before the block pushing component 551 pushes a block from the task trace structure 561 of a task. The trace structure managing component 550 may include a locking component 553 for locking when pushing and fetching blocks from the global trace structure 560.

The task tracing system 520 may include a task trace obtaining component 523 for obtaining task trace data for a task in the form of an ordered list of blocks by: finding an a last entry of an oldest block in the global trace structure 560 for a task; adding subsequent blocks for the task from the global trace structure 560; and adding blocks from the task trace structure 561 for the task.

The task tracing system 520 may include a contiguous global trace component 524 for obtaining a contiguous global trace including: obtaining task traces data blocks for each task from a last entry of an oldest block; and doing a merge sort of trace data entries from all tasks.

Figure 6:
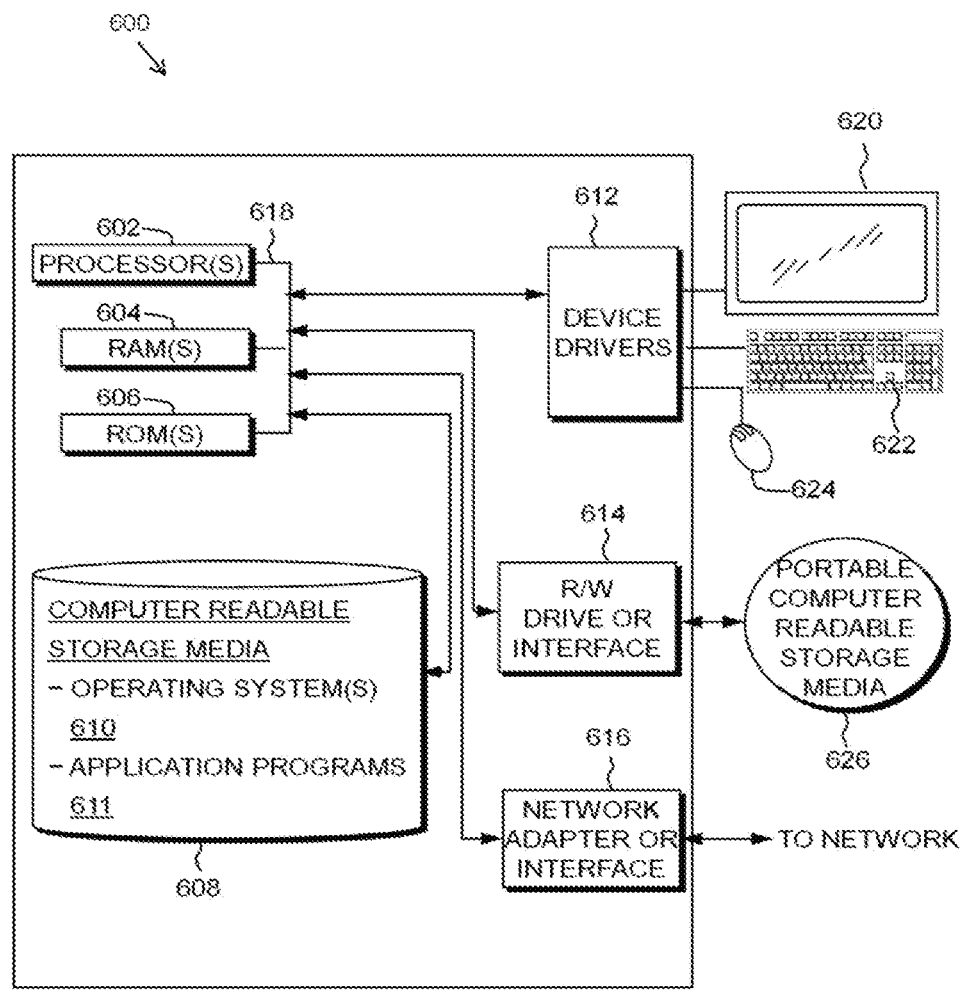
FIG. 6 is a block diagram of an embodiment of a computer system or cloud server in which the present invention may be implemented.

FIG. 6 depicts a block diagram of components of an example computing device 600 that may provide the form of the traced computing system 530 and/or the computing system 510 of FIG. 5, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as [benchmark analysis system 140, transaction processing system 120, and database management system 130] are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 600 can also include a R/W drive or interface 614 to read from and write to one or more portable computer readable storage media 626. Application programs 611 on computing device 600 can be stored on one or more of the portable computer readable storage media 626, read via the respective R/W drive or interface 614 and loaded into the respective computer readable storage media 608.

Computing device 600 can also include a network adapter or interface 616, such as a TCP/IP adapter card or wireless communication adapter. Application programs 611 on computing device 600 can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 600 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
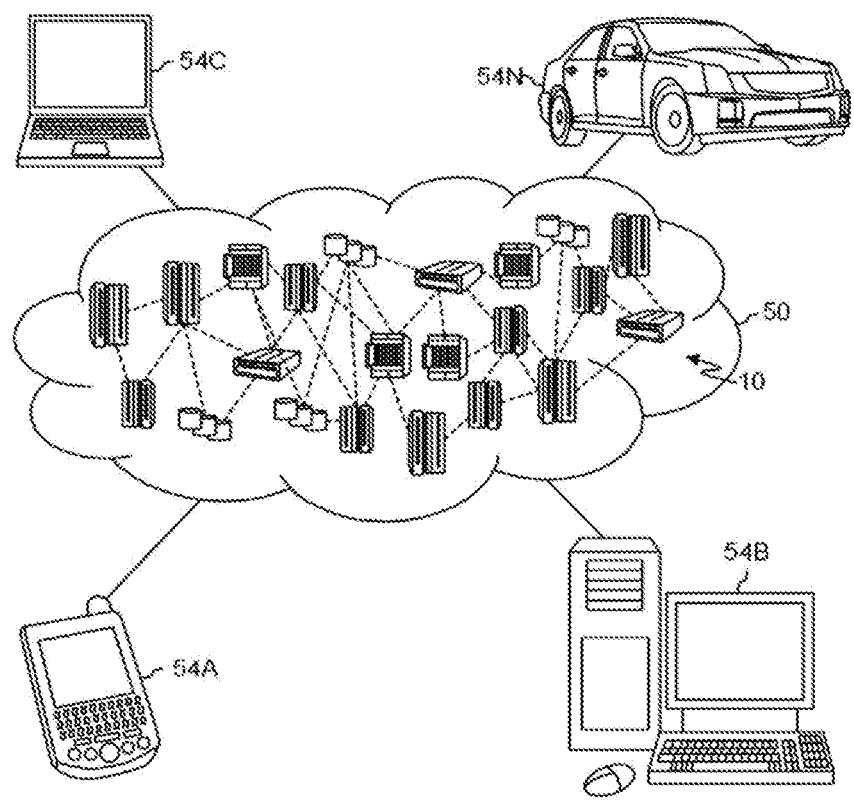
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
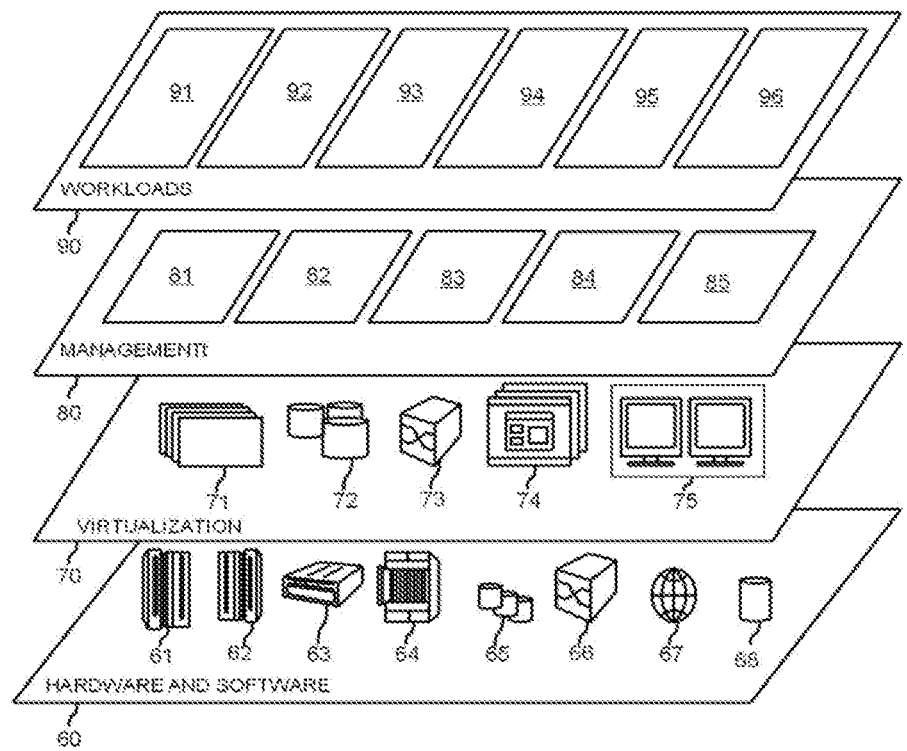
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and capturing task trace data 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer program product for capturing task traces for multiple tasks, the computer program product comprising a computer readable storage medium having program instructions embodied therewith, the program instructions executable by a processor to cause the processor to:

capture, in a task trace structure, trace data entries for a task of multiple tasks, wherein the task trace structure is segmented into a predefined number of blocks provided for recording trace data entries for each task of the multiple tasks; and push older blocks from the task trace structure to a global trace structure based on the task trace structure being full, wherein a first trace mode captures multiple task traces for the multiple tasks with each task of the multiple tasks capturing its task trace in the task trace structure, and wherein a second trace mode stores in the global trace structure pushed older blocks of data that exceed the predefined number of blocks from the task trace structure of the first trace mode.

2. The computer program product as claimed in claim 1, further comprising:
performing two simultaneous trace modes to create both the task trace structure and the global trace structure, wherein the two simultaneous trace modes are performed by generating only one trace record.

3. The computer program product as claimed in claim 1, wherein blocks of the task trace structure, and blocks of the global trace structure are combined to create a contiguous global trace.

4. The computer program product as claimed in claim 1, including:
pushing a block from a task trace structure of a task to the global trace structure when there is not enough available space in a block of the task trace structure of the task to capture new trace data entries; and
fetching an oldest block of the global trace structure to be overwritten by the new trace data entries in the task trace structure of the task.

5. The computer program product as claimed in claim 1, wherein an oldest block of the global trace structure is pre-fetched before pushing a block from the task trace structure to the global trace structure.

6. The computer program product as claimed in claim 1, wherein trace data entries are written to a block in the task trace structure without locking as the task trace structure is owned by the task of the multiple tasks.

7. The computer program product as claimed in claim 1, including locking when pushing and fetching blocks from the global trace structure.

8. A system for capturing task traces for multiple tasks, comprising:
a processor and a memory configured to provide computer program instructions to the processor to execute functions of components including:
a trace data writing component configured to write trace data entries for a task of multiple tasks that execute in parallel with each task of the multiple tasks having a task trace structure segmented into a predefined number of blocks, wherein the task trace structure is provided for recording trace data entries for each task of the multiple tasks that execute in parallel, and wherein the trace data entries for the task of the multiple tasks are written to a block in the task trace structure with a timestamp of the trace data entries for the task of the multiple tasks; and
a trace structure managing component configured to manage the task trace structures of the multiple tasks and a global trace structure, wherein the task trace structures of the multiple tasks capture the trace data entries for a task of the multiple tasks and the global trace structure maintains an ordered structure of older blocks pushed from all of the task trace structures of the multiple tasks.

9. The system as claimed in claim 8, wherein the trace structure managing component includes:
a block pushing component configured to push a block from a task trace structure of a task to the global trace structure when there is not enough available space in a block of the task trace structure of the task to capture new trace data entries; and
a block fetching component configured to fetch an oldest block of the global trace structure to be overwritten by the new trace data entries from in the task trace structure of the task.

10. The system as claimed in claim 9, wherein the block fetching component pre-fetches the oldest block of the global trace structure before the block pushing component pushes the block from the task trace structure of the task to the global trace structure, and wherein the global trace structure is a first in first out queue of a defined number of blocks.

11. The system as claimed in claim 8, wherein a block in the task trace structure accommodates a sufficient number of trace data entries to analyze a stalled task.

12. The system as claimed in claim 8, wherein a timestamp of the trace data entries for the task of the multiple tasks is sufficiently precise to be unique for the task of the multiple tasks.

13. The system as claimed in claim 8, wherein the trace data writing component writes trace data entries to a block in the task trace structure without locking as the task trace structure is owned by the task of the multiple tasks.

14. The system as claimed in claim 8, wherein the trace structure managing component includes a locking component configured to lock when pushing and fetching blocks from the global trace structure.

15. A computer-implemented method for capturing task traces for multiple tasks, comprising:
capturing, in a task trace structure, trace data entries for a task of multiple tasks segmented into a predefined number of available blocks, wherein the task trace structure is provided for recording trace data entries for each task of the multiple tasks, and wherein the trace data entries for the task of the multiple tasks are written to a block in the task trace structure with a timestamp of sufficiently precision to be unique for the task of the multiple tasks; and
storing, in a global trace structure, pushed blocks from the task trace structures of the multiple tasks of older data that exceed the predefined number of available blocks of the task trace structures of the multiple tasks, wherein the global trace structure is provided for recording older trace data entries from all of the multiple tasks, and wherein the pushed blocks are ordered in the global trace structure by an order of the pushed blocks from the task trace structures of the multiple tasks.

16. The computer-implemented method as claimed in claim 15, including obtaining task trace data for the task of the multiple tasks in the form of an ordered list of blocks by:
finding a last entry of an oldest block in the global trace structure for the task of the multiple tasks;
adding subsequent blocks for the task of the multiple tasks from the global trace structure; and
adding blocks from the task trace structure for the task of the multiple tasks.

17. The computer-implemented method as claimed in claim 15, wherein contiguous trace data of the multiple tasks is merged using timestamps of trace data entries to obtain global contiguous data.

18. The computer-implemented method as claimed in claim 15, wherein a top entry of each time ordered queue of a multiple of time ordered queues is read, an oldest entry is removed from the time ordered queue, and the oldest entry is added to a global contiguous output.

19. The computer-implemented method as claimed in claim 15, wherein a block accommodates a sufficient number of trace data entries to analyze a stalled task, wherein the sufficient number of trace data entries fit in the block, and wherein the sufficient number of trace data entries include the timestamp of sufficiently precision to be unique for the task of the multiple tasks.

20. The computer-implemented method as claimed in claim 15, wherein the global trace structure is a first in first out queue of a defined number of blocks.

\* \* \* \* \*